United States Patent
Shishihara et al.

(10) Patent No.: US 11,149,787 B2
(45) Date of Patent: Oct. 19, 2021

(54) THRUST ROLLER BEARING

(71) Applicant: JTEKT CORPORATION, Osaka (JP)

(72) Inventors: Yuki Shishihara, Kashiwara (JP); Shigeo Kamamoto, Kashiwara (JP); Junji Murata, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 16/790,145

(22) Filed: Feb. 13, 2020

(65) Prior Publication Data

US 2020/0271161 A1     Aug. 27, 2020

(30) Foreign Application Priority Data

Feb. 27, 2019  (JP) .............................. JP2019-033896
Feb. 27, 2019  (JP) .............................. JP2019-034293

(51) Int. Cl.
  *F16C 19/30* (2006.01)
  *F16C 33/46* (2006.01)
  *F16C 33/34* (2006.01)

(52) U.S. Cl.
  CPC ............ *F16C 19/305* (2013.01); *F16C 33/34* (2013.01); *F16C 33/4676* (2013.01); *F16C 33/4682* (2013.01); *F16C 33/4605* (2013.01)

(58) Field of Classification Search
  CPC .. F16C 19/305; F16C 19/463; F16C 33/4605; F16C 33/4623; F16C 33/4629; F16C 33/4635; F16C 33/467; F16C 33/4676; F16C 33/4682
  See application file for complete search history.

(56) References Cited

U.S. PATENT DOCUMENTS

| | | | | |
|---|---|---|---|---|
| 2,978,282 A | * | 4/1961 | Fisher | F16C 33/541 384/623 |
| 3,226,170 A | * | 12/1965 | Neese | F16C 33/543 384/623 |
| 7,837,394 B2 | * | 11/2010 | Takamizawa | F16C 33/4635 384/623 |
| 9,593,714 B1 | * | 3/2017 | Ince | F16C 33/543 |
| 10,584,743 B2 | * | 3/2020 | Shishihara | F16C 19/46 |
| 10,948,012 B2 | * | 3/2021 | Shishihara | F16C 33/4682 |
| 2015/0292557 A1 | * | 10/2015 | Wey | F16C 33/4676 384/575 |
| 2019/0242624 A1 | | 8/2019 | Saito et al. | |
| 2019/0368542 A1 | | 12/2019 | Shishihara et al. | |

FOREIGN PATENT DOCUMENTS

| | | |
|---|---|---|
| JP | 2016-200266 A | 12/2016 |
| JP | 2018-066501 A | 4/2018 |

* cited by examiner

*Primary Examiner* — James Pilkington
(74) *Attorney, Agent, or Firm* — Oliff PLC (57) ABSTRACT

A thrust roller bearing includes a plurality of rollers and a cage including a plurality of cage pockets for housing the rollers. The rollers each include a cylindrical portion, an outer crowning portion, and an inner crowning portion. The cage pockets each include an outer surface, an inner surface facing a second end surface of the roller, and a pair of side surfaces facing an outer peripheral surface of the roller. The side surfaces each include a recessed surface that is not contactable with the roller, and flat surfaces that are provided on the outer side in the radial direction and on the inner side in the radial direction, respectively, and are contactable with the roller. A first dimension is larger than a second dimension.

6 Claims, 6 Drawing Sheets

THRUST ROLLER BEARING

INCORPORATION BY REFERENCE

The disclosure of Japanese Patent Application No. 2019-034293 filed on Feb. 27, 2019 and Japanese Patent Application No. 2019-033896 filed on Feb. 27, 2019, each including the specification, drawings and abstract, is incorporated herein by reference in its entirety.

BACKGROUND

1. Technical Field

The present disclosure relates to a thrust roller bearing.

2. Description of Related Art

Thrust roller bearings are able to receive an axial load generated between a first member and a second member that rotate relative to each other. The thrust roller bearings are able to be downsized especially when rollers are needle rollers. Further, the thrust roller bearings can cope with rotation at a high speed and have large load capacity. The thrust roller bearings are applied to transmission devices of an automobile and an industrial construction machine, and also widely used in other rotary devices (refer to Japanese Unexamined Patent Application Publication No. 2018-66501 (JP 2018-66501 A)).

SUMMARY

When a thrust roller bearing (hereinafter also simply referred to as a "bearing") rotates, a roller rolls between a raceway surface of the first member and a raceway surface of the second member. The roller that has a columnar shape tends to move straight along the raceways. However, the roller is housed in a cage pocket included in a cage, and the cage regulates the movement of the roller so that the roller moves in a circumferential direction. During this movement, an outer peripheral surface of the roller makes a partial contact with a side surface of the cage pocket that faces the outer peripheral surface of the roller, and the roller slides on a contact portion of the cage pocket. When a sliding frictional resistance at the contact portion between the cage pocket and the roller increases, low torque characteristics of the bearing deteriorate.

In recent years, there are demands for achieving the low torque characteristics of the thrust roller bearing in various rotary devices so as to improve rotation efficiency, that is, to reduce a rotation loss. For this reason, it is desired to reduce the sliding frictional resistance at the contact portion between the cage pocket and the roller as much as possible. Therefore, the present disclosure reduces the sliding frictional resistance at the contact portion between the roller and the cage to achieve the low torque characteristics.

An aspect of the present disclosure is a thrust roller bearing. The thrust roller bearing includes a plurality of rollers disposed between a first raceway surface and a second raceway surface that face each other, and a cage including a plurality of cage pockets that houses the respective rollers such that a central axis of each of the rollers extends along a radial direction. The rollers each include a cylindrical portion provided in the middle of the roller in an axial direction of the roller, an outer crowning portion provided on an outer side of the cylindrical portion in the radial direction, and an inner crowning portion on an inner side of the cylindrical portion in the radial direction. The cage pockets each include an outer surface provided with a protrusion that is contactable with a first end surface of the roller on the outer side in the radial direction, an inner surface that faces a second end surface of the roller on the inner side in the radial direction, and a pair of side surfaces facing an outer peripheral surface of the roller. The side surfaces each include a recessed surface that is provided in the middle of the cage pocket in the radial direction and is not contactable with the roller and flat surfaces that are provided on the outer side in the radial direction and on the inner side in the radial direction, respectively, and are contactable with the roller. A first dimension is larger than a second dimension. The first dimension is a dimension along the radial direction from the first end surface that is contactable with the protrusion to a boundary between the outer crowning portion and the cylindrical portion. The second dimension is a dimension along the radial direction from a contact point where the first end surface contacts the protrusion to a boundary between the flat surface on the outer side in the radial direction and the recessed surface.

With the above configuration, when the thrust roller bearing rotates, the rollers roll between the first raceway surface and the second raceway surface while the first end surface of each of the rollers is brought into contact with the protrusion provided in the cage pocket by a centrifugal force. Since the first dimension is larger than the second dimension, the outer crowning portion of the roller is brought into contact with the flat surface in the cage pocket on the outer side in the radial direction. The outer crowning portion includes an arc generatrix. Therefore, the roller and the cage can be in contact (point contact) with each other in a region of the cage pocket on the outer side in the radial direction in a form of contact that forms a contact ellipse. This makes it possible to reduce a sliding frictional resistance between the rollers and the cage, which achieves low torque characteristics.

In the thrust roller bearing according to the above aspect, the outer crowning portion may include a first portion that has an arc generatrix having a first radius of curvature and is adjacent to the cylindrical portion, and a second portion that has an arc generatrix having a second radius of curvature smaller than the first radius of curvature and that is adjacent to the first portion. A third dimension may be smaller than the second dimension. The third dimension may be a dimension along the radial direction from the first end surface that is contactable with the protrusion to a boundary between the first portion and the second portion. According to the above configuration, the first portion in the outer crowning portion of the roller is brought into contact with the flat surface of the cage pocket on the outer side in the radial direction. The first portion has a larger radius of curvature of the arc generatrix compared to the second portion. With this configuration, the contact ellipse formed between the flat surface and the first portion can be relatively made larger. Accordingly, a surface pressure at the contact portion between the roller and the cage is reduced, which can suppress occurrence of wear.

In the thrust roller bearing according to the above aspect, a raised roundness may be provided at the boundary between the flat surface on the outer side in the radial direction and the recessed surface. According to the above configuration, even when the outer crowning portion of the roller contacts the boundary, the edge load does not occur.

In the thrust roller bearing according to the above aspect, a fourth dimension may be smaller than a fifth dimension. The fourth dimension may be a dimension along the radial direction from the first end surface that is contactable with the protrusion to a boundary between the inner crowning portion and the cylindrical portion. The fifth dimension may be a dimension along the radial direction from the contact point where the first end surface contacts the protrusion to a boundary between the flat surface on the inner side in the radial direction and the recessed surface. According to the above configuration, since the fourth dimension is smaller than the fifth dimension, the inner crowning portion of the roller is brought into contact with the flat surface in the cage pocket on the inner side in the radial direction. The inner crowning portion includes an arc generatrix. Therefore, the roller and the cage can be brought in contact (point contact) with each other in a region of the cage pocket on the inner side in the radial direction in the form of contact that forms the contact ellipse. This makes it possible to reduce a sliding frictional resistance between the rollers and the cage, which achieves low torque characteristics.

In the thrust roller bearing according to the above aspect, the inner crowning portion may include a third portion that has an arc generatrix having a third radius of curvature and is adjacent to the cylindrical portion, and a fourth portion that has by an arc generatrix having a fourth radius of curvature smaller than the third radius of curvature and that is adjacent to the third portion. A sixth dimension may be larger than the fifth dimension. The sixth dimension may be a dimension along the radial direction from the first end surface that is contactable with the protrusion to a boundary between the third portion and the fourth portion. According to the above configuration, the third portion in the inner crowning portion of the roller is brought into contact with the flat surface of the cage pocket on the inner side in the radial direction. The third portion has a larger radius of curvature of the arc generatrix compared to the fourth portion. With this configuration, the contact ellipse formed between the flat surface and the third portion can be relatively made larger. Accordingly, a surface pressure at the contact portion between the roller and the cage is reduced, which can suppress occurrence of wear.

In the thrust roller bearing according to the above aspect, a raised roundness may be provided at the boundary between the flat surface on the inner side in the radial direction and the recessed surface. According to the above configuration, even when the inner crowning portion of the roller contacts the boundary, the edge load does not occur.

With the present disclosure, the sliding frictional resistance at the contact portion between the roller and the cage is reduced, which achieves the low torque characteristics of the thrust roller bearing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
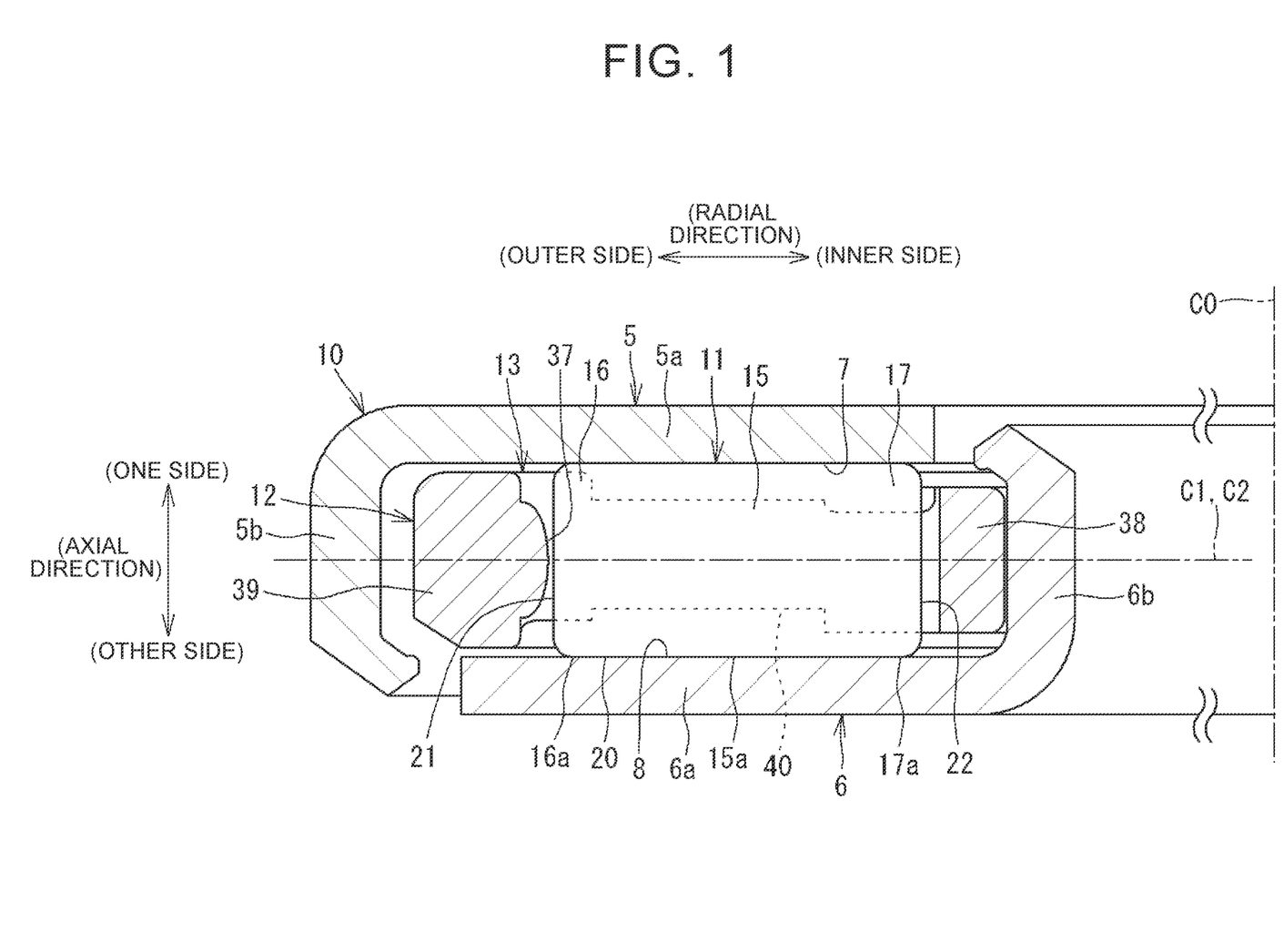
FIG. 1 is a cross-sectional view showing an example of a thrust roller bearing.

FIG. 1 is a cross-sectional view showing an example of a thrust roller bearing. A thrust roller bearing 10 (hereinafter also simply referred to as "bearing 10") shown in FIG. 1 includes an annular cage 12 and a plurality of rollers 11. The bearing 10 of a present disclosure further includes an annular first bearing ring (housing bearing washer) 5 disposed on an one side of the bearing 10 in an axial direction of the bearing 10 (the upper side in FIG. 1) and a second bearing ring (shaft bearing washer) 6 disposed on the other side of the bearing 10 in the axial direction (the lower side in FIG. 1).

The first bearing ring 5 and the second bearing ring 6 rotate relative to each other about an central axis C0 of the bearing 10. In the present disclosure, a direction along the central axis C0 of the bearing 10 is referred to as "axial direction". The term "axial direction" includes a direction parallel to the central axis C0. A direction orthogonal to the central axis C0 is denoted as a "radial direction about the central axis C0" (hereinafter simply referred to as "radial direction"). A circumferential direction about the central axis C0, that is, a direction of the relative rotation between the first bearing ring 5 and the second bearing ring 6 is denoted as a "circumferential direction of the bearing 10" (hereinafter simply referred to as a "circumferential direction"). In the present disclosure, a central axis of the cage 12 is coincident with the central axis C0 of the bearing 10.

The first bearing ring 5 includes an annular first body portion 5a and a first rib portion 5b. The first rib portion 5b has a short cylinder shape, and extends toward the other side in the axial direction from an outer end of the first body portion 5a in the radial direction. A first raceway surface 7 that is flat and annular is provided on a surface of the first body portion 5a on the other side in the axial direction. The second bearing ring 6 includes an annular second body portion 6a and a second rib portion 6b. The second rib portion 6b has a short cylinder shape, and extends toward the one side in the axial direction from an inner end of the second body portion 6a in the radial direction. A second raceway surface 8 that is flat and annular is provided on a surface of the second body portion 6a on the one side in the axial direction. The cage 12 and the rollers 11 are disposed between the first raceway surface 7 and the second raceway surface 8. When the bearing 10 rotates, the rollers 11 rolls between the first raceway surface 7 and the second raceway surface 8 in a state where the rollers 11 are held by the cage 12.

In the bearing 10, the first bearing ring 5 and the second bearing ring 6 may be omitted. In this case, although not shown, a first member included in a device in which the bearing 10 is provided serves as a substitute for the first bearing ring 5, and a second member included in the device serves as a substitute for the second bearing ring 6. The first member is formed with the annular first raceway surface 7, and the second member is formed with the annular second raceway surface 8.

Figure 2:
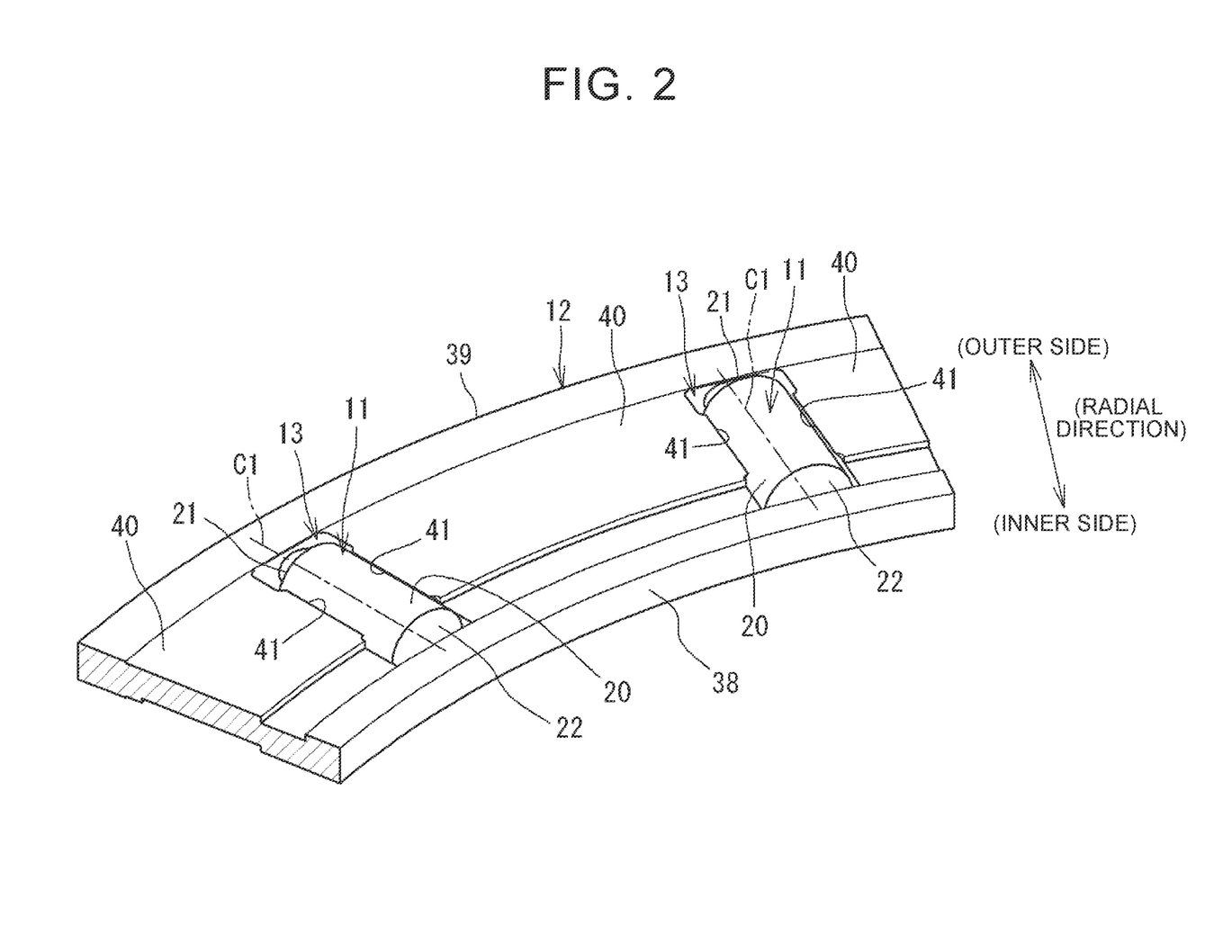
FIG. 2 is a perspective view showing a part of a cage that houses rollers.

FIG. 2 is a perspective view showing a part of the cage 12 holding the rollers 11 therein. The cage 12 has a plurality of cage pockets 13. The cage pockets 13 are arranged radially about the central axis C0 (see FIG. 1). The cage 12 includes an inner annular body 38 disposed on an inner side in the radial direction, an outer annular body 39 disposed on an outer side in the radial direction, and a plurality of cage bars 40 connecting the inner annular body 38 and the outer annular body 39. A space between the inner annular body 38 and the outer annular body 39 and between the cage bars 40 that are adjacent to each other in the circumferential direction serves as each of the cage pockets 13.

The rollers 11 has a columnar shape. In FIGS. 1 and 2, the roller 11 has a first end surface 21 on the outer side in the radial direction, a second end surface 22 on the inner side in the radial direction, and an outer peripheral surface 20. The rollers 11 according to the present disclosure may be cylindrical rollers or long cylindrical rollers, in addition to the needle rollers. Each of the cage pockets 13 houses one roller 11. The rollers 11 are housed in the respective cage pockets 13 so that the central axis C1 of each of the rollers 11 is coincident with the radial direction.

As described above, in the bearing 10 according to the present disclosure, the rollers 11 are disposed between the first raceway surface 7 and the second raceway surface 8 that face each other. The cage 12 has a plurality of cage pockets 13. The cage pockets 13 each hold the roller 11 with a central axis C1 of the roller 11 arranged along the radial direction. For this reason, an appropriate clearance is provided between the outer peripheral surface 20 of the roller 11 and the cage bar 40. The rollers 11, the first bearing ring 5, and the second bearing ring 6 are made of steel. The cage 12 may be made of metal (made of steel). However, in the present disclosure, the cage 12 is made of resin so as to reduce a sliding frictional resistance.

Figure 3:
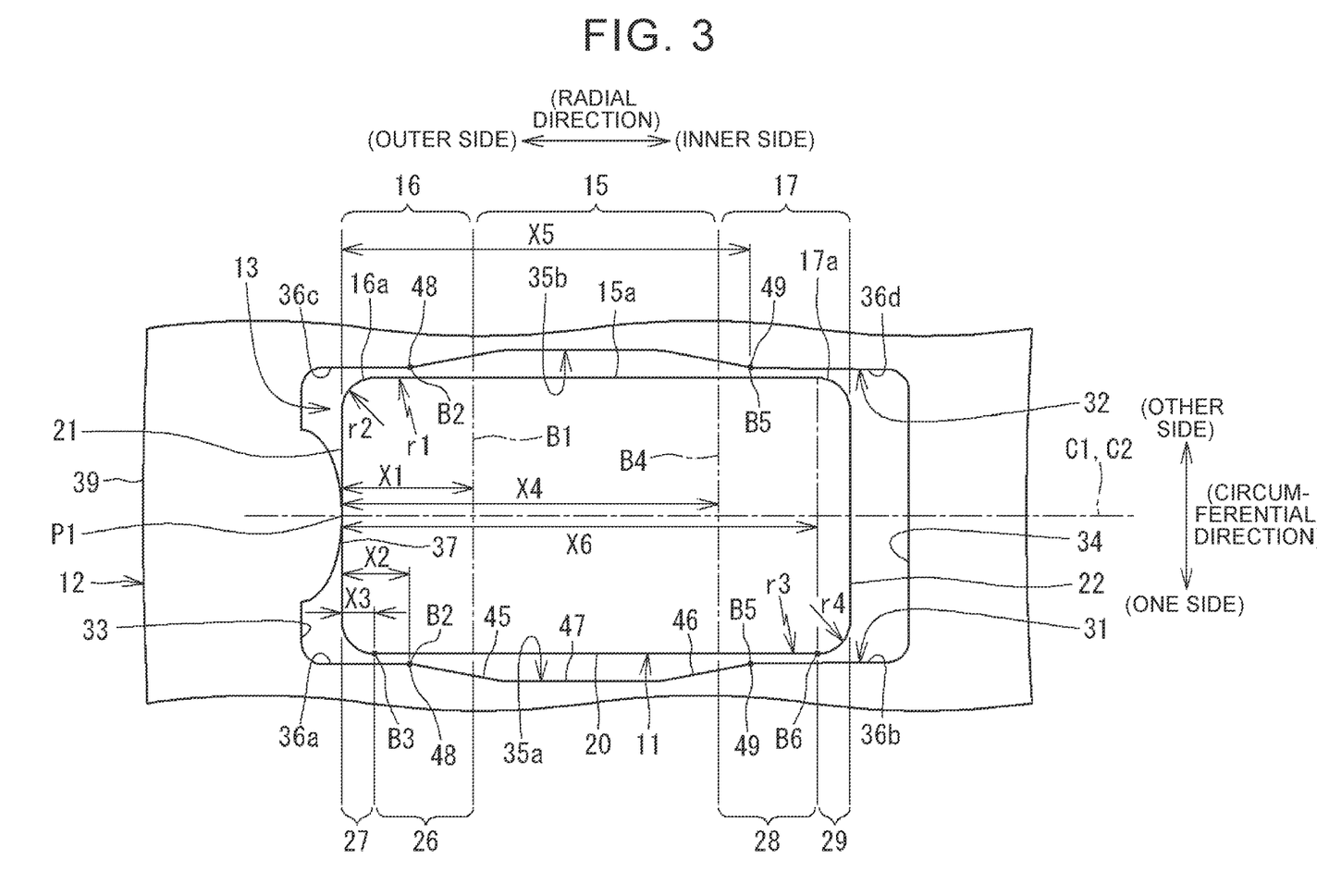
FIG. 3 is a view showing a cage pocket and the roller in a cross-section that is taken along a line orthogonal to a central axis of the thrust roller bearing and includes a central axis of the roller.

The shape of the roller 11 will be further described. FIG. 3 is a view showing the cage pocket 13 and the roller 11 in a cross-section that is orthogonal to the central axis C0 of the bearing 10 (see FIG. 1) and includes the central axis C1 of the roller 11. The roller 11 includes a cylindrical portion 15 in the middle, an outer crowning portion 16, and an inner crowning portion 17. The cylindrical portion 15 is interposed between the outer crowning portion 16 and the inner crowning portion 17.

The cylindrical portion 15 is a portion provided in the middle of the roller 11 in the axial direction of the roller 11, and is formed to include a linear generatrix. An outer peripheral surface 15a of the cylindrical portion 15 has a cylindrical surface that is parallel to the central axis C1 of the roller 11. The outer crowning portion 16 is a portion provided adjacent to the cylindrical portion 15 on the outer side in the radial direction, and is formed to include an arc generatrix. An outer peripheral surface 16a of the outer crowning portion 16 has a shape in which its diameter gradually decreases toward the first end surface 21 side. The inner crowning portion 17 is a portion provided adjacent to the cylindrical portion 15 on the inner side in the radial direction, and is formed to include an arc generatrix. An outer peripheral surface 17a of the inner crowning portion 17 has a shape in which its diameter gradually decreases toward the second end surface 22 side.

The outer peripheral surface 20 of the roller 11 includes the outer peripheral surface 15a of the cylindrical portion 15, the outer peripheral surface 16a of the outer crowning portion 16, and the outer peripheral surface 17a of the inner crowning portion 17.

The outer crowning portion 16 is configured of two portions. That is, the outer crowning portion 16 includes a first portion 26 that is adjacent to the cylindrical portion 15 and a second portion 27 that is adjacent to the first portion 26. An outer peripheral surface of the first portion 26 includes an arc generatrix having a first radius of curvature r1 in the cross-section including the central axis C1 of the roller 11. An outer peripheral surface of the second portion 27 includes an arc generatrix having a second radius of curvature r2 that is smaller than the first radius of curvature r1 in the cross-section including the central axis C1 of the roller 11. The outer peripheral surface 15a of the cylindrical portion 15 and the outer peripheral surface of the first portion 26 are connected in a differentiable manner in the cross-section including the central axis C1 of the roller 11. The outer peripheral surface of the first portion 26 and the outer peripheral surface of the second portion 27 are connected in a differentiable manner in the cross-section including the central axis C1 of the roller 11.

The inner crowning portion 17 is configured of two portions. That is, the inner crowning portion 17 includes a third portion 28 that is adjacent to the cylindrical portion 15 and a fourth portion 29 that is adjacent to the third portion 28. An outer peripheral surface of the third portion 28 includes an arc generatrix having a third radius of curvature r3 in the cross-section including the central axis C1 of the roller 11. An outer peripheral surface of the fourth portion 29 includes an arc generatrix having a fourth radius of curvature r4 that is smaller than the third radius of curvature r3 in the cross-section including the central axis C1 of the roller 11. The outer peripheral surface 15a of the cylindrical portion 15 and the outer peripheral surface of the third portion 28 are connected in a differentiable manner in the cross-section including the central axis C1 of the roller 11. The outer peripheral surface of the third portion 28 and the outer peripheral surface of the fourth portion 29 are connected in a differentiable manner in the cross-section including the central axis C1 of the roller 11. In the present disclosure, the first radius of curvature r1 has the same value as that of the third radius of curvature r3, and the second radius of curvature r2 has the same value as that of the fourth radius of curvature r4.

Figure 4:
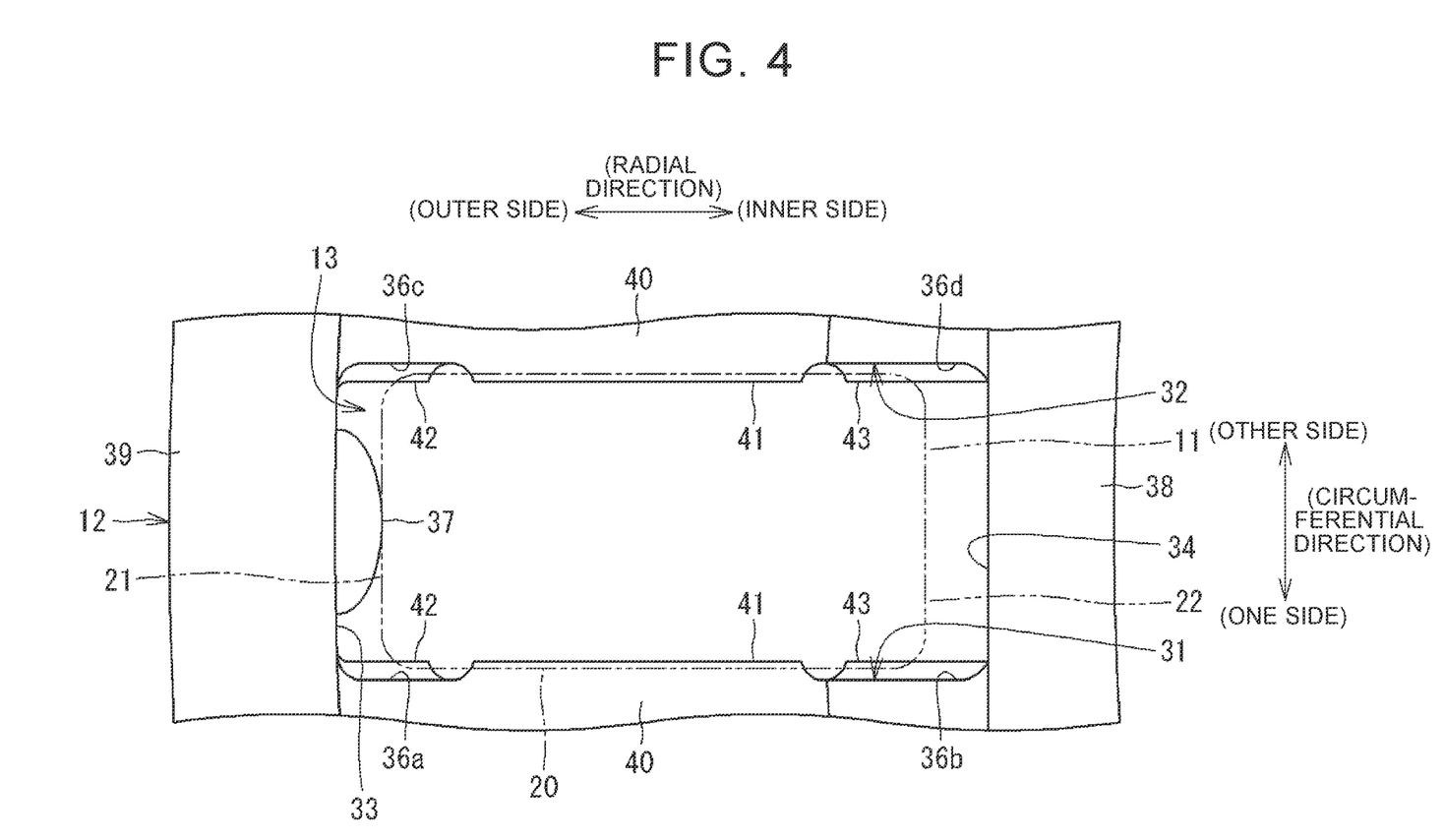
FIG. 4 is a view of the cage pocket of the cage as viewed from an one axial side.
Figure 5:
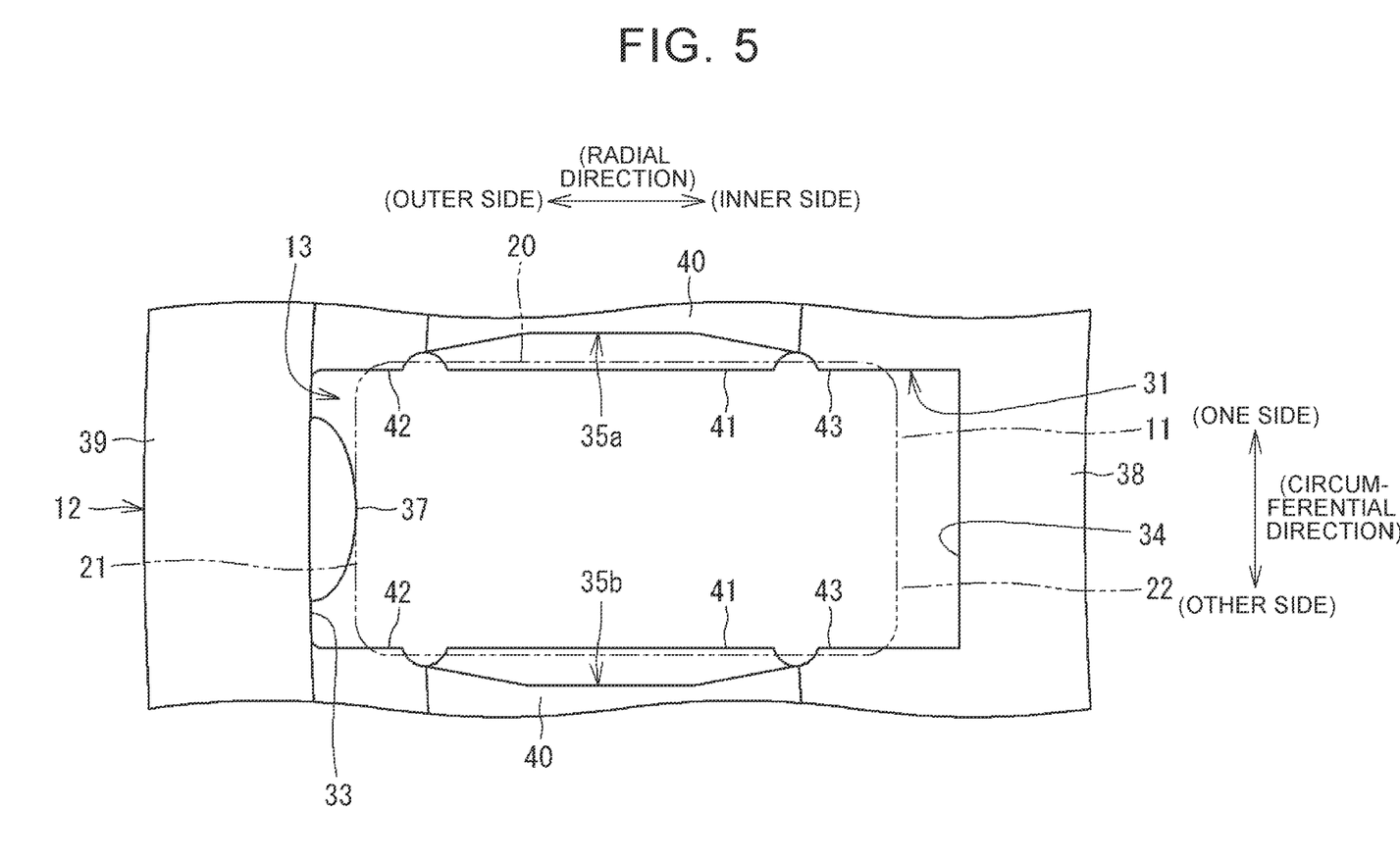
FIG. 5 is a view of the cage pocket of the cage as viewed from the other axial side.

FIG. 4 is a view of the cage pocket 13 of the cage 12 as viewed from the one side in the axial direction. FIG. 5 is a view of the cage pocket 13 of the cage 12 as viewed from the other side in the axial direction. In FIGS. 4 and 5, the roller 11 is indicated as a hidden outline (by long dashed double-short dashed lines). The cage pocket 13 is configured as a space surrounded by an outer surface 33, an inner surface 34, and a pair of side surfaces 31, 32.

The outer surface 33 is configured by a surface of the outer annular body 39 on the inner side in the radial direction. A curved protrusion 37 is provided on the outer surface 33. The protrusion 37 is contactable with the first end surface 21 of the roller 11. The protrusion 37 according to the present disclosure has a curved surface that extends along a spherical surface as a contacting surface with the roller 11. The innermost position on the curved surface of the protrusion 37 in the radial direction is located on a virtual plane that is located in the same distance from opposing surfaces of the cage bars 40 that are adjacent to each other in the circumferential direction. When the bearing 10 rotates, the roller 11 tends to move outward in the radial direction by a centrifugal force. The first end surface 21 of the roller 11 then makes a point contact with the protrusion 37, which positions the roller 11 in the radial direction. The inner surface 34 is configured of a surface of the inner annular body 38 on the outer side in the radial direction. The inner surface 34 faces the second end surface 22 of the roller 11.

The first side surface 31 on the one side in the circumferential direction is configured of a surface of the cage bar 40 that is located on the one side in the circumferential direction with respect to the roller 11. The surface of the cage bar 40 faces toward the other side in the circumferential direction. The first side surface 31 faces the outer peripheral surface 20 of the roller 11. The second side surface 32 on the other side in the circumferential direction is configured of a surface of the cage bar 40 that is located on the other side in the circumferential direction with respect to the roller 11. The surface of the cage bar 40 faces toward the one side in the circumferential direction. The second side surface 32 faces the outer peripheral surface 20 of the roller 11.

As shown in FIG. 4, each of the cage pockets 13 is provided with a pair of first raised portions 41 so as to face each other in the circumferential direction. The first raised portions 41 are provided in the middle of the respective cage bars 40 in the radial direction. The first raised portion 41 is provided so as to protrude from the cage bar 40 in the circumferential direction on the one side in the axial direction. In the cage pocket 13, the distance between the pair of first raised portions 41 is smaller than the diameter of the roller 11. With this configuration, the roller 11 housed in the cage pocket 13 is prevented from falling off toward the one side in the axial direction by the first raised portions 41.

As shown in FIG. 5, each of the cage pockets 13 is provided with a pair of second raised portions 42 so as to face each other in the circumferential direction. The second raised portions 42 are provided on the respective cage bars 40 on the outer side in the radial direction. The second raised portions 42 are provided so as to protrude from the cage bar 40 in the circumferential direction on the other side in the axial direction. The distance between the pair of second raised portions 42 is smaller than the diameter of the roller 11. With this configuration, the roller 11 housed in the cage pocket 13 is prevented from falling off toward the other side in the axial direction by the second raised portions 42. As shown in FIG. 5, each of the cage pockets 13 is provided with a pair of third raised portions 43 so as to face each other in the circumferential direction. The third raised portions 43 are provided on the respective cage bars 40 on the inner side in the radial direction. The third raised portions 43 are provided so as to protrude from the cage bar 40 in the circumferential direction on the other side in the axial direction. The distance between the pair of third raised portions 43 is smaller than the diameter of the roller 11. With this configuration, the roller 11 housed in the cage pocket 13 is prevented from falling off toward the other side in the axial direction by the third raised portions 43.

FIG. 3 shows a state where a central axis C2 of the cage pocket 13 along the radial direction coincides with the central axis C1 of the roller 11 (this state is hereinafter referred to as a "coincident state"). The central axis C2 of the cage pocket 13 is a line on the virtual plane that is located in the same distance from opposing surfaces of the cage bars 40 that are adjacent to each other in the circumferential direction, and extends in the radial direction including the innermost position of the protrusion 37 in the radial direction. In this state, the roller 11 protrudes from a surface of the cage 12 on the one side in the axial direction toward the one side in the axial direction, and also protrudes from a surface of the cage 12 on the other side in the axial direction toward the other side in the axial direction. Further, in this state, a clearance is provided between the first side surface 31 of the cage pocket 13 and the outer peripheral surface 20 of the roller 11, and between the second side surface 32 of the cage pocket 13 and the outer peripheral surface 20 of the roller 11. The first side surface 31 included in the cage pocket 13 on the one side in the circumferential direction includes a central recessed surface 35a, and flat surfaces 36a, 36b that interpose the central recessed surface 35a therebetween. Similar to the first side surface 31 on the one side in the circumferential direction, the second side surface 32 included in the cage pocket 13 on the other side in the circumferential direction includes a central recessed surface 35b, and flat surfaces 36c, 36d that interpose the central recessed surface 35b therebetween. The first side surface 31 and the second side surface 32 have the same configuration. Therefore, the configuration of the first side surface 31 on the one side in the circumferential direction will be described as an example.

The flat surface 36a is a surface that is provided in the cage pocket 13 on the outer side in the radial direction and is contactable with the roller 11. The flat surface 36b is a surface that is provided in the cage pocket 13 on the inner side in the radial direction and is contactable with the roller 11. The recessed surface 35a is provided in the cage pocket 13 in the middle in the radial direction. The recessed surface 35a is a surface that is recessed from the flat surfaces 36a, 36b, and that is not contactable with the roller 11. The recessed surface 35a includes an outer inclined surface 45, an inner inclined surface 46, and a middle surface 47. On the outer inclined surface 45, a width dimension of the cage pocket 13 in the circumferential direction gradually increases from the flat surface 36a disposed on the outer side in the radial direction. On the inner inclined surface 46, the width dimension of the cage pocket 13 in the circumferential direction gradually increases from the flat surface 36b disposed on the inner side in the radial direction. The middle surface 47 is disposed between the outer inclined surface 45 and the inner inclined surface 46. In the coincident state, the flat surfaces 36a, 36b and the middle surface 47 are parallel to the central axis C1 of the roller 11. Each of the flat surfaces 36a, 36b is configured of a surface to be flat both in the radial direction and the axial direction, excluding the second raised portions 42 and the third raised portions 43 (see FIGS. 4 and 5).

A raised roundness (round chamfering) 48 is provided at a boundary B2 between the flat surface 36a on the outer side in the radial direction and the recessed surface 35a (outer inclined surface 45). Further, a raised roundness (round chamfering) 49 is provided at a boundary B5 between the flat surface 36b on the inner side in the radial direction and the recessed surface 35a (inner inclined surface 46). The second side surface 32 on the other side in the circumferential direction has the same configuration as that of the first side surface 31 on the one side in the circumferential direction with respect to the roundness at the boundary B2 and the boundary B5 as described above. That is, the raised roundness 48 is provided at the boundary B2 between the flat surface 36c on the outer side in the radial direction and the recessed surface 35b. Further, the raised roundness 49 is provided at the boundary B5 between the flat surface 36d on the inner side in the radial direction and the recessed surface 35b. The dimension of the roundness 48 and 49, that is, the dimension of round chamfering, is 1 millimeter or more and 5 millimeters or less, for example.

Figure 6:
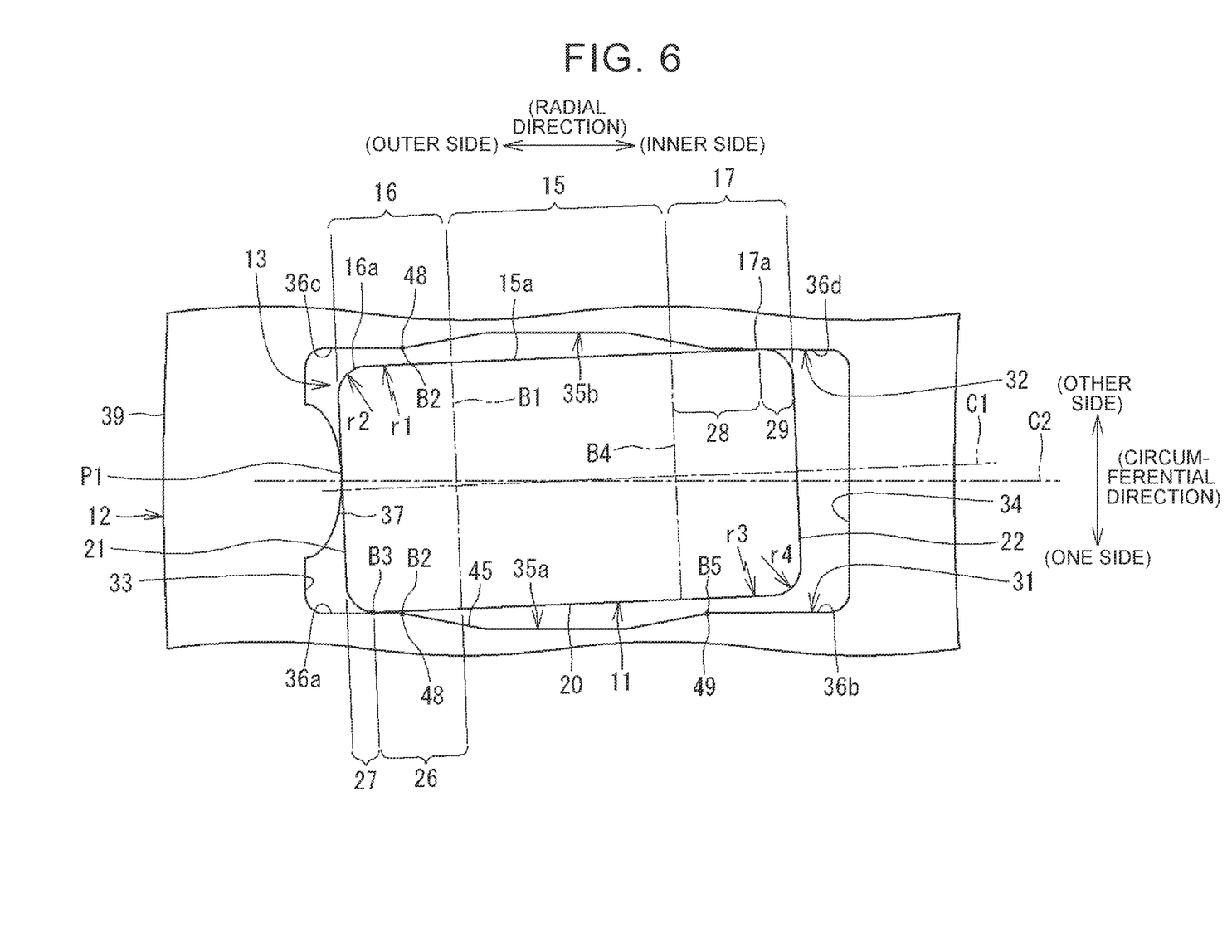
FIG. 6 is a cross-sectional view showing a state where the roller is inclined.

FIG. 6 shows a state where the central axis C1 of the roller 11 is inclined with respect to the central axis C2 of the cage pocket 13 that extends along the radial direction (this state is hereinafter referred to as a "non-coincident state"). When the roller 11 skews within the range of the cage pocket 13, the non-coincident state as described above is established. The term "skew" in the present disclosure denotes the state where the roller 11 is inclined with respect to the normal rotation axis of the roller 11. The normal rotation axis coincides with the central axis C2 of the cage pocket 13.

When the bearing 10 rotates, the roller 11 rolls between the first raceway surface 7 (see FIG. 1) and the second raceway surface 8 in the state where the first end surface 21 of the roller 11 is brought into contact with the protrusion 37 of the cage pocket 13 by a centrifugal force. As shown in FIG. 6, when the roller 11 is inclined in the cage pocket 13, the outer crowning portion 16 of the roller 11 is brought into contact with the flat surface 36a and the inner crowning portion 17 of the roller 11 is brought into contact with the flat surface 36d, while the first end surface 21 of the roller 11 is in contact with the protrusion 37. In this state, the roller 11 is positioned in the cage pocket 13 and rotates.

With referring back to FIG. 3, the dimensions of each portion of the roller 11 and the cage pocket 13 will be described. A first dimension X1 as defined below with respect to the roller 11 is larger than a second dimension X2 as defined below with respect to the cage pocket 13 (X1>X2). The first dimension X1 is a dimension along the radial direction from the first end surface 21 of the roller 11 where the protrusion 37 of the cage pocket 13 contacts to the boundary B1 between the outer crowning portion 16 and the cylindrical portion 15. The second dimension X2 is a dimension along the radial surface from a contact point P1 where the first end surface 21 of the roller 11 contacts the protrusion 37 of the cage pocket 13 to the boundary B2 (provided, however, that the boundary B2 is a boundary between the flat surface 36a (36c) on the outer side in the radial direction and the recessed surface 35a (35b)).

Since the first dimension X1 is larger than the second dimension X2 as described above, the outer crowning portion 16 of the roller 11 is brought into contact with the flat surface 36a of the cage pocket 13 on the outer side in the radial direction when the bearing 10 rotates and the roller 11 is inclined in the cage pocket 13 as shown in FIG. 6. The outer crowning portion 16 includes, as already described above, an arc generatrix. This makes it possible for the outer crowning portion 16 of the roller 11 and the flat surface 36a of the cage pocket 13 to contact (make a point contact) with each other in a form of contact that forms a contact ellipse. Consequently, the sliding frictional resistance at the contact portion between the roller 11 and the cage 12 is reduced, which achieves low torque characteristics.

Further, when the bearing 10 rotates in the reverse direction and the roller 11 is inclined in the direction opposite to the direction shown in FIG. 6, the outer crowning portion 16 is brought into contact with the flat surface 36c on the opposite side (not illustrated). Even in this case, the outer crowning portion 16 of the roller 11 and the flat surface 36c of the cage pocket 13 are in contact (point contact) with each other in the form of contact that forms the contact ellipse.

Further, in the present disclosure (see FIG. 3), a third dimension X3 as defined below is smaller than the second dimension X2 (X3<X2). The third dimension X3 is a dimension along the radial direction from the first end surface 21 that contacts the protrusion 37 to the boundary B3 between the first portion 26 and the second portion 27 included in the outer crowning portion 16.

According to this configuration, as shown in FIG. 6, the first portion 26 of the outer crowning portion 16 of the roller 11 is brought into contact with the flat surface 36a of the cage pocket 13 because the inclination angle of the roller 11 is small (for example, the inclination angle is smaller than 3 degrees). As already described above, the first portion 26 has a larger radius of curvature of the arc generatrix compared to the second portion 27 (r1>r2). With this configuration, the contact ellipse formed between the flat surface 36a and the first portion 26 can be relatively made larger. Accordingly, a surface pressure at the contact portion between the roller 11 and the cage 12 is reduced, which can suppress occurrence of wear. In this configuration, the relationship (first dimension X1>second dimension X2>third dimension X3) is established.

Further, in the present disclosure (see FIG. 3), a fourth dimension X4 as defined below with respect to the roller 11 is smaller than a fifth dimension X5 as defined below with respect to the cage pocket 13 (X4<X5). The fourth dimension X4 is a dimension along the radial direction from the first end surface 21 of the roller 11 with which the protrusion 37 of the cage pocket 13 is contactable to the boundary B4 between the inner crowning portion 17 and the cylindrical portion 15. The fifth dimension X5 is a dimension along the radial direction from the contact point P1 where the first end surface 21 of the roller 11 contacts the protrusion 37 of the cage pocket 13 to the boundary B5 (provided, however, that the boundary B5 is a boundary between the flat surface 36d on the inner side in the radial direction and the recessed surface 35b).

Since the fourth dimension X4 is smaller than the fifth dimension X5 as described above, the inner crowning portion 17 of the roller 11 is brought into contact with the flat surface 36d of the cage pocket 13 on the inner side in the radial direction when the bearing 10 rotates and the roller 11 is inclined in the cage pocket 13 as shown in FIG. 6. As described above, the inner crowning portion 17 includes an arch generatrix. This makes it possible for the inner crowning portion 17 of the roller 11 and the flat surface 36d of the cage pocket 13 to contact (make a point contact) with each other in the form of contact that forms the contact ellipse. Consequently, the sliding frictional resistance at the contact portion between the roller 11 and the cage 12 is reduced, which achieves low torque characteristics.

For example, when the bearing 10 rotates in the reverse direction and the roller 11 is inclined in the direction opposite to the direction shown in FIG. 6, the inner crowning portion 17 is brought into contact with the flat surface 36b on the opposite side (not illustrated). Also in this case, the inner crowning portion 17 of the roller 11 and the flat surface 36b of the cage pocket 13 are in contact (point contact) with each other in the form of contact that forms the contact ellipse.

Further, in the present disclosure (see FIG. 3), a sixth dimension X6 as defined below is larger than the fifth dimension X5 (X6>X5). The sixth dimension X6 is a dimension along the radial direction from the first end surface 21 that is contactable with the protrusion 37 to the boundary B6 between the third portion 28 and the fourth portion 29 included in the inner crowning portion 17.

According to this configuration, as shown in FIG. 6, the third portion 28 included in the inner crowning portion 17 of the roller 11 is brought into contact with the flat surface 36d of the cage pocket 13 because the inclination angle of the roller 11 is small (for example, the inclination angle is smaller than 3 degrees). As described above, the third portion 28 has a larger radius of curvature of an arc generatrix compared to the fourth portion 29 (r3>r4). With this configuration, the contact ellipse formed between the flat surface 36d and the third portion 28 can be relatively made larger. Accordingly, a surface pressure at the contact portion between the roller 11 and the cage 12 is reduced, which can suppress occurrence of wear. In this configuration, the relationship (fourth dimension X4<fifth dimension X5<sixth dimension X6) is established.

In FIG. 3, the raised roundness 48 is provided at the boundary B2 between the flat surface 36a of the cage pocket 13 on the outer side in the radial direction and the recessed surface 35a. With this configuration, even when the outer crowning portion 16 of the roller 11 contacts the boundary B2, an edge load does not occur. Further, as described above, the raised roundness 49 is provided at the boundary B5 between the flat surface 36d of the cage pocket 13 on the inner side in the radial direction and the recessed surface 35b. With this configuration, even when the inner crowning portion 17 of the roller 11 contacts the boundary B5, an edge load does not occur.

In FIG. 3, according to the configuration in which the first dimension X1 is larger than the second dimension X2 and the fourth dimension X4 is smaller than the fifth dimension X5, the cylindrical portion 15 of the roller 11 is located within a range of the cage pocket 13 in the radial direction where the recessed surface 35a (35b) is formed with the first end surface 21 of the roller 11 in contact with the protrusion 37. Therefore, when the bearing 10 rotates and the roller 11 is inclined in the cage pocket 13 as shown in FIG. 6, the outer crowning portion 16 and the inner crowning portion 17 each including an arc generatrix are brought into contact with the flat surface 36a of the cage pocket 13 on the outer side in the radial direction and the flat surface 36d of the cage pocket 13 on the inner side in the radial direction, respectively. As described above, each of the outer crowning portion 16 and the inner crowning portion 17 includes an arc generatrix. This makes it possible for the roller 11 and the cage 12 to contact (make a point contact) with each other at portions on the outer side in the radial direction and on the inner side in the radial direction in the form of contact that forms the contact ellipse. Consequently, the sliding frictional resistance at the contact portion between the roller 11 and the cage 12 is reduced, which achieves low torque characteristics.

As described above, according to the thrust roller bearing 10 according to the present disclosure, the sliding frictional resistance at the contact portion between the roller 11 and the cage 12 is reduced. Consequently, the low torque characteristics of the thrust roller bearing 10 can be achieved. Further, it is possible to suppress a temperature rise caused by the sliding contact between the roller 11 and the cage 12.

The embodiment disclosed herein is illustrative but is not limitative in all respects. The scope of the present disclosure is not limited to the embodiment described above, and includes any and all modifications within the scope equivalent to the configuration described in the claims.

What is claimed is:

1. A thrust roller bearing comprising:
   a plurality of rollers disposed between a first raceway surface and a second raceway surface that face each other; and
   a cage including a plurality of cage pockets that each house a respective roller of the plurality of rollers such that a central axis of each of the rollers extends along a radial direction, wherein:
   the rollers each include a cylindrical portion provided in the middle of the roller in an axial direction of the roller, an outer crowning portion provided on an outer side of the cylindrical portion in the radial direction, and an inner crowning portion on an inner side of the cylindrical portion in the radial direction;
   the cage pockets each include an outer surface provided with a protrusion that is contactable with a first end surface of the roller on the outer side in the radial direction, an inner surface that faces a second end surface of the roller on the inner side in the radial direction, and a pair of side surfaces facing an outer peripheral surface of the roller;
   the side surfaces each include a recessed surface that is provided in the middle of the cage pocket in the radial direction and is not contactable with the roller and flat surfaces that are provided on the outer side in the radial direction and on the inner side in the radial direction, respectively, and are contactable with the roller; and
   a first dimension is larger than a second dimension, the first dimension being a dimension along the radial direction from the first end surface that is contactable with the protrusion to a boundary between the outer crowning portion and the cylindrical portion, and the second dimension being a dimension along the radial direction from a contact point where the first end surface contacts the protrusion to a boundary between the flat surface on the outer side in the radial direction and the recessed surface.

2. The thrust roller bearing according to claim 1, wherein:
   the outer crowning portion includes a first portion that has an arc generatrix having a first radius of curvature and is adjacent to the cylindrical portion, and a second portion that has an arc generatrix having a second radius of curvature smaller than the first radius of curvature and that is adjacent to the first portion; and
   a third dimension is smaller than the second dimension, the third dimension being a dimension along the radial direction from the first end surface that is contactable with the protrusion to a boundary between the first portion and the second portion.

3. The thrust roller bearing according to claim 2, wherein a fourth dimension is smaller than a fifth dimension, the fourth dimension being a dimension along the radial direction from the first end surface that is contactable with the protrusion to a boundary between the inner crowning portion and the cylindrical portion, and the fifth dimension being a dimension along the radial direction from the contact point where the first end surface contacts the protrusion to a boundary between the flat surface on the inner side in the radial direction and the recessed surface.

4. The thrust roller bearing according to claim 3, wherein the inner crowning portion includes a third portion that has an arc generatrix having a third radius of curvature and is adjacent to the cylindrical portion, and a fourth portion that has an arc generatrix having a fourth radius of curvature smaller than the third radius of curvature and that is adjacent to the third portion, and a sixth dimension is larger than the fifth dimension, the sixth dimension being a dimension along the radial direction from the first end surface that is contactable with the protrusion to a boundary between the third portion and the fourth portion.

5. The thrust roller bearing according to claim 3, wherein a raised roundness is provided at the boundary between the flat surface on the inner side in the radial direction and the recessed surface.

6. The thrust roller bearing according to claim 1, wherein a raised roundness is provided at the boundary between the flat surface on the outer side in the radial direction and the recessed surface.

* * * * *